(12) United States Patent
Jung et al.

(10) Patent No.: US 8,937,699 B2
(45) Date of Patent: Jan. 20, 2015

(54) LIQUID CRYSTAL DISPLAY

(75) Inventors: Mee-Hye Jung, Suwon-si (KR);
Doo-Hwan You, Gwangmyeong-si (KR);
Young-Hoon Yoo, Asan-si (KR);
Woo-Sung Sohn, Seoul (KR);
Sung-Hoon Kim, Seoul (KR); Jae-Yong Shin, Suwon-si (KR); Se-Hyoung Cho, Seoul (KR); Hye-Seok Na, Suwon-si (KR); Hong-Jo Park, Asan-si (KR);
Hyang-Yul Kim, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 377 days.

(21) Appl. No.: 13/155,949

(22) Filed: Jun. 8, 2011

(65) Prior Publication Data
US 2012/0038843 A1  Feb. 16, 2012

(30) Foreign Application Priority Data

Aug. 12, 2010 (KR) .......................... 10-2010-0077963
Oct. 28, 2010 (KR) .......................... 10-2010-0106263

(51) Int. Cl.
*G02F 1/1337* (2006.01)
*G02F 1/1343* (2006.01)
*G02F 1/1362* (2006.01)

(52) U.S. Cl.
CPC ...... *G02F 1/134309* (2013.01); *G02F 1/13624* (2013.01); *G02F 2001/134345* (2013.01)
USPC ............................. 349/129; 349/139; 349/141

(58) Field of Classification Search
USPC .................................. 349/129, 139, 143, 141
See application file for complete search history.

(56) References Cited

U.S. PATENT DOCUMENTS

2006/0001815 A1* 1/2006 Kim et al. ..................... 349/141

* cited by examiner

*Primary Examiner* — Dung Nguyen
(74) *Attorney, Agent, or Firm* — H.C. Park & Associates, PLC

(57) ABSTRACT

A liquid crystal display according to an exemplary embodiment of the present invention includes: a first substrate and an opposing second substrate; a first pixel electrode and a second pixel electrode disposed in a pixel area, on the first substrate, and including a plurality of branch electrodes; and a liquid crystal layer interposed between the first and second electrodes. Branches electrode of the first pixel electrode and the second pixel electrode are interlaced. The first pixel electrode has an extension disposed adjacent to the center of the pixel area, and a minimum distance between the extension and the adjacent branch electrode is different from an average minimum between the adjacent branch electrodes.

9 Claims, 14 Drawing Sheets

(a)

(b)

(c)

(d)

LIQUID CRYSTAL DISPLAY

CROSS-REFERENCE TO RELATED APPLICATION

This application claims priority to and the benefit of Korean Patent Application Nos. 10-2010-0077963 and 10-2010-0106263 filed on Aug. 12, 2010 and Oct. 28, 2010, which are incorporated herein by reference for all purposes as if fully set forth herein.

BACKGROUND OF THE INVENTION

1. Field of the Invention

Exemplary embodiments of the present invention relate to liquid crystal displays.

2. Description of the Related Art

Liquid crystal displays are among the most common type of flat panel displays. A liquid crystal display includes two display panels, where electric field generating electrodes, such as a pixel electrode and a common electrode are formed, and a liquid crystal layer interposed there between. A liquid crystal display generates an electric field in the liquid crystal layer, by applying a voltage to the electric field generating electrodes, to orient liquid crystal molecules of the liquid crystal layer, and controls polarization of incident light to thereby display an image.

A liquid crystal display also includes a switching element connected to each pixel electrode, and a plurality of signal lines including gate lines and data lines for applying the voltage to the pixel electrode, by controlling the switching element.

A liquid crystal display receives an input image signal from an external graphic controller. The input image signal contains luminance information for each pixel. Each luminance has a predetermined number. Each pixel is applied with a data voltage corresponding to a desired luminance. The data voltage applied to the pixel is represented as a pixel voltage, depending on a difference with a relative voltage. Each pixel displays a luminance that is embodied by the gray of the image signal, according to the pixel voltage. In this case, a pixel voltage range that the liquid crystal display can use is determined according to a driver.

Meanwhile, in order to apply the data voltage to each pixel electrode of the liquid crystal display, each pixel electrode is connected to the switching element. Since light is not transmitted from a location where the switching element is formed, a higher number of switching elements leads to a smaller aperture ratio for the liquid crystal display. Further, contact holes are formed to connect various signal transferring lines, which are formed on different layers, for transferring the signal to each pixel. Light is not transmitted through areas where the contact holes are formed. As a result, the contact holes decrease the aperture ratio of the liquid crystal display.

As the length of a signal line increases, the resistance of the signal line also increases, which leads to signal delays. As a result, display quality may be reduced.

The driver of a liquid crystal display is mounted directly on a display panel, in the form of a plurality of integrated circuit chips, or is mounted on a flexible circuit film attached to the display panel. The integrated circuit chip represents a significant portion of the manufacturing costs of a liquid crystal display. In particular, as the number of data lines increases, the cost of the driver of a liquid crystal display also increases.

In order to improve the display quality of a liquid crystal display, a liquid crystal display should have a high contrast ratio, an excellent optical viewing angle, and a high response speed.

The above information disclosed in this Background section is only for enhancement of understanding of the background of the invention and therefore it may contain information that does not constitute prior art.

SUMMARY OF THE INVENTION

Aspects of the present invention relate to a liquid crystal display having a high contrast ratio, a wide viewing angle, an increased response speed, and a reduced cost.

An exemplary embodiment of the present invention provides a liquid crystal display including: a first substrate and an opposing second substrate; a first pixel electrode and a second pixel electrode disposed on the first substrate and including a plurality of branch electrodes; and a liquid crystal layer interposed between the first and second substrates. Branch electrodes of the first pixel electrode and the second pixel electrode are alternately disposed. The first pixel electrode has an extension disposed adjacent to the center of a first pixel area, and a gap between the extension portion and the branch electrode adjacent to the extension portion is different from an average gap between the adjacent branch electrodes.

Another exemplary embodiment of the present invention provides a liquid crystal display including: a first substrate and an opposing second substrate; a first pixel electrode and a second pixel electrode disposed on the first substrate and including a plurality of branch electrodes; and a liquid crystal layer interposed between the first and second substrates. The branch electrodes of the first pixel electrode and the second pixel electrode are alternately disposed, edges of the first pixel electrode and the second pixel electrode are separated from each other, and the separated portion of the edges of the first pixel electrode and the second pixel electrode is spaced apart from the center of the first pixel electrode and the second pixel electrode.

Yet another exemplary embodiment of the present invention provides a liquid crystal display including: a first substrate and an opposing second substrate; a first pixel electrode and a second pixel electrode disposed on the first substrate and including a plurality of branch electrodes; and a liquid crystal layer interposed between the first and second substrates. The branch electrode of the first pixel electrode the second pixel electrode are alternately disposed, edges of the first pixel electrode and the second pixel electrode are separated from each other, and a gap between the edges of the first pixel electrode and the second pixel electrode is larger than the gap between the branch electrodes of the first pixel electrode and the second pixel electrode.

Still another exemplary embodiment of the present invention provides a liquid crystal display including: a first substrate and an opposing second substrate; a first pixel electrode and a second pixel electrode disposed on the first substrate and including a plurality of branch electrodes; and a liquid crystal layer interposed between the first and second substrates. Branch electrodes of the first pixel electrode and the second pixel electrode are alternately disposed, and the first pixel electrode includes an extension disposed at the center of the first pixel electrode, and the second pixel electrode and an additional branch extending from the extension portion.

Still yet another exemplary embodiment of the present invention provides a liquid crystal display including: a first substrate and an opposing second substrate; a liquid crystal layer interposed between the first pixel electrode and the second pixel electrode; first and second pixel electrodes disposed on the first substrate and separated from each other. The first and second pixel electrodes include a plurality of alternately disposed branch electrodes. The first and second pixel electrodes include a first region in which a gap between the branches of the first pixel electrode and the branches of the second pixel electrode is relatively large, and a second region in which the gap between the branch electrodes of the first pixel electrode and the branch electrodes of the second pixel electrode is relatively small. An area of the first region is at least about 8 times larger than that of the second region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
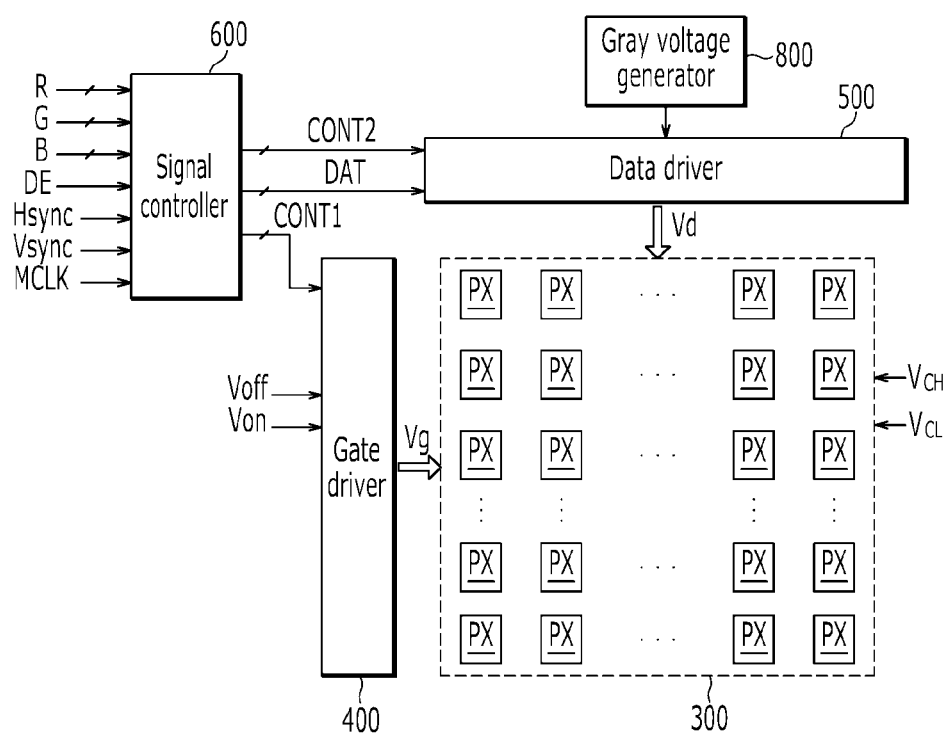
FIG. 1 is a block diagram of a liquid crystal display, according to an exemplary embodiment of the present invention.

Aspects of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. In addition, a "minimum distance" between two elements refers to the shortest distance between the two elements.

Figure 2:
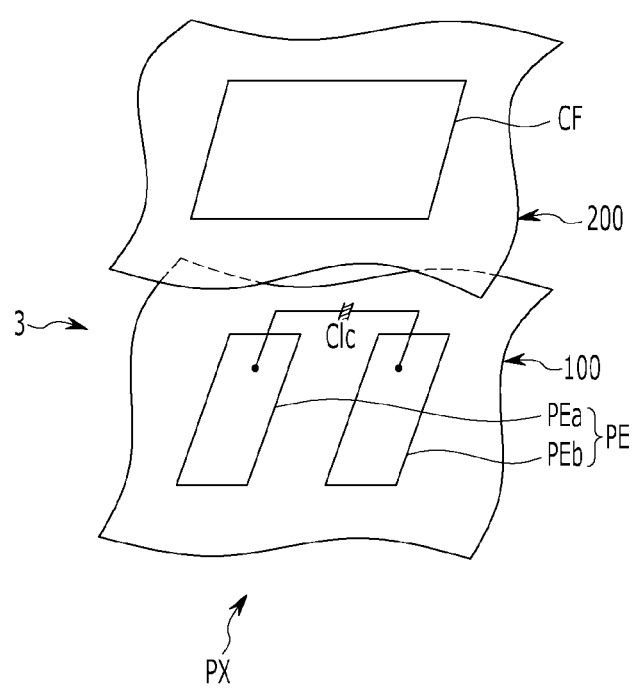
FIG. 2 is an equivalent circuit diagram illustrating a pixel structure of the liquid crystal display, according to an exemplary embodiment of the present invention.

FIG. 1 is a block diagram of a liquid crystal display, according to an exemplary embodiment of the present invention, and FIG. 2 is an equivalent circuit diagram illustrating a pixel structure of the liquid crystal display, according to an exemplary embodiment of the present invention. Referring to FIG. 1, the liquid crystal display includes a liquid crystal panel assembly 300, a gate driver 400, a data driver 500, a gray voltage generator 800, and a signal controller 600.

Referring to FIG. 2, the liquid crystal panel assembly 300 includes a lower display panel 100, an opposing upper display panel 200, and a liquid crystal layer 3 interposed therebetween. The liquid crystal panel assembly 300 also includes a liquid crystal capacitor Clc disposed on the lower panel 100.

The liquid crystal capacitor Clc includes a first pixel electrode PEa and a second pixel electrode PEb as two terminals. The liquid crystal layer 3 between the first and second pixel electrodes PEa and PEb operates as a dielectric layer. The first pixel electrode PEa is connected with a first switching element (not shown), and the second pixel electrode PEb is connected with a second switching element (not shown). The first switching element and the second switching element are each respectively connected to a gate line (not shown) and a data line (not shown).

The liquid crystal layer 3 has dielectric anisotropy. A long axis of liquid crystal molecules of the liquid crystal layer 3 may be aligned vertically between the display panels, without the application of an electric field.

The first pixel electrode PEa and the second pixel electrode PEb may be formed on different layers or on the same layer. First and second storage capacitors (not shown) operating in an ancillary fashion to the operation of the liquid crystal capacitor Clc may include an additional electrode (not shown) provided on the lower display panel 100. The additional electrode overlaps each of the first and second pixel electrodes PEa and PEb, with an insulator interposed there between.

In order to implement a color display, each pixel PX may display a primary color (spatial division). Alternately, each pixel PX may display primary colors as time elapses (temporal division), to recognize a desired color by the sum of the spatial and temporal divisions of the primary colors.

The primary colors may be colors such as red, green, and blue. In FIG. 2, each pixel PX includes a color filter CF that displays one of the primary colors, on regions of the upper display panel 200 corresponding to the first and second pixel electrodes PEa and PEb, as an example of the spatial division. Unlike FIG. 2, the color filter CF may be disposed on or under the first and second pixel electrodes PEa and PEb of the lower display panel 100. At least one polarizer (not shown) is provided in the liquid crystal panel assembly 300.

Figure 3:
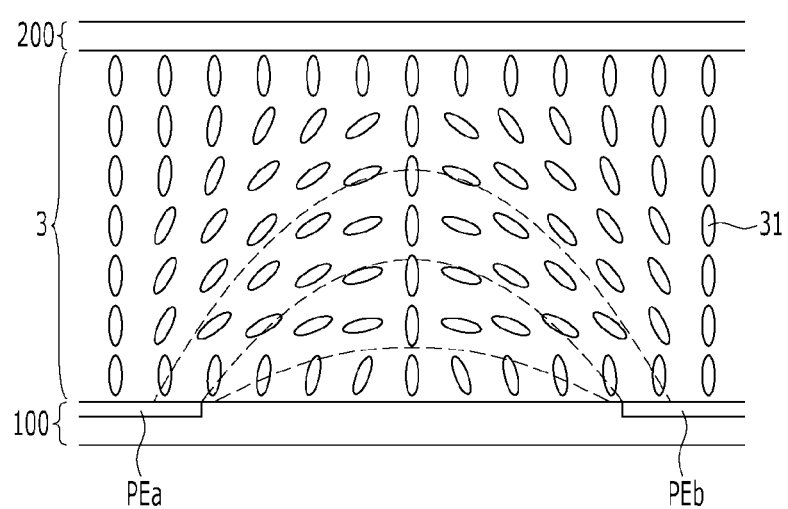
FIG. 3 is a schematic cross-sectional view of a liquid crystal display, according to an exemplary embodiment of the present invention.

FIG. 3 is a schematic cross-sectional view of a liquid crystal display, according to an exemplary embodiment of the present invention. Referring to FIGS. 2 and 3, when voltages VCH and VCL are applied to a data line and a power line connected to each pixel, the voltages are applied to a corresponding pixel PX through first and second switching elements that are turned on by a gate signal. That is, a first data voltage or a first voltage is applied to the first pixel electrode PEa through the first switching element, and a second data voltage or a second voltage is applied to the second pixel electrode PEb through the second switching element. In this case, a difference between the voltages applied to the first pixel electrode PEa and the second pixel electrode PEb is a voltage corresponding to a luminance to be displayed by the pixel PX. The voltages applied to the first pixel electrode PEa and the second pixel electrode PEb may have polarities opposite to each other, with respect to a reference voltage Vref.

A difference between two voltages applied to the first pixel electrode PEa and the second pixel electrode PEb and having different polarities is a charging voltage of the liquid crystal capacitor Clc, that is, a pixel voltage. When a potential difference is generated at both ends of the liquid crystal capacitor Clc, an electric field parallel to surfaces of the display panels 100 and 200 is generated in the liquid crystal layer 3 between the first and second pixel electrodes PEa and PEb, as shown in FIG. 3. When liquid crystal molecules 31 have a positive dielectric anisotropy, a long axis of the liquid crystal molecules 31 is inclined to be parallel to the direction of the electric field. The degree of inclination depends on the magnitude of the pixel voltage. The liquid crystal layer 3 may be referred to as an electrically-induced optical compensation (EOC) module. In addition, a variation in the degree of polarization of light passing through the liquid crystal layer 3 depends on the degree of inclination of the liquid crystal molecules 31. The polarization variation results in a variation of light transmittance through a polarizer. The pixel PX displays a desired luminance through the operation of the polarizer.

Since two voltages having different polarities with respect to the reference voltage Vref are applied to one pixel PX, it is possible to increase a driving voltage, increase a response speed of the liquid crystal molecule, and increase the transmittance of the liquid crystal display. In addition, since the polarities of the two voltages applied to one pixel PX are opposite to each other, although the data driver 500 has a column inversion or a row inversion format, it is possible to prevent a deterioration of image quality, due to a flicker phenomenon associated with dot inversion driving.

When the first and second switching elements are turned off in one pixel PX, since all the voltages applied to the first and second pixel electrodes PEa and PEb drop by each kickback voltage, the charging voltage of the pixel PX is nearly unchanged. Accordingly, it is possible to improve a display characteristic of the liquid crystal display.

Figure 4:
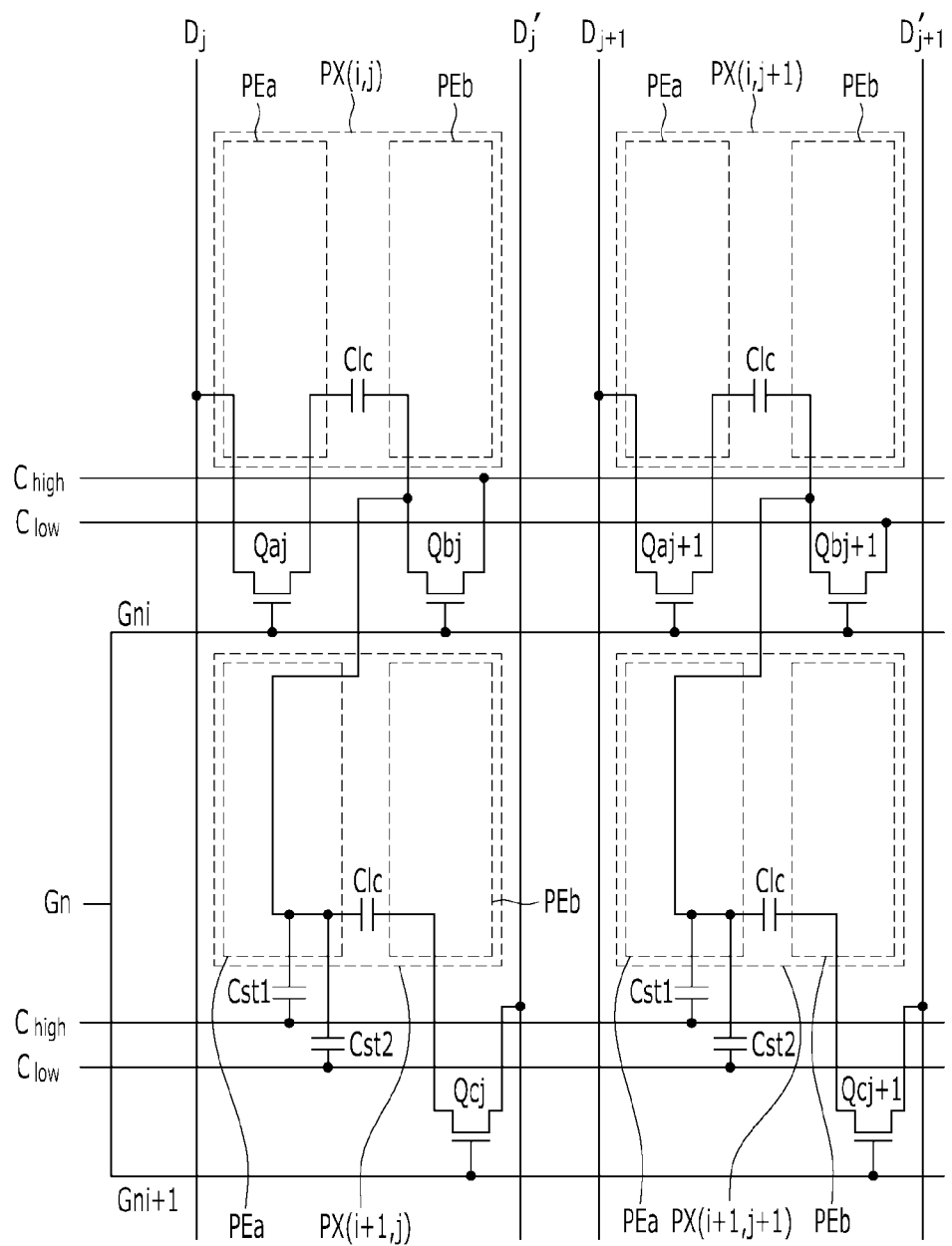
FIG. 4 is an equivalent circuit diagram of four pixels of a liquid crystal display, according to an exemplary embodiment of the present invention.

FIG. 4 is an equivalent circuit diagram for four pixels of a liquid crystal display, according to an exemplary embodiment of the present invention. Referring to FIGS. 2 and 4, the liquid crystal display includes: a plurality of first pixels PX(i, j) and a plurality of second pixels PX(i+1, j), which are adjacent to each other in a pixel column direction; a plurality of third pixels PX(i, j+1) and a plurality of fourth pixels PX(i+1, j+1) that are respectively adjacent to the plurality of first pixels PX(i, j) and the plurality of second pixels PX(i+1, j), in a pixel row direction. Herein, "i" and "j" refer to positive integers.

The liquid crystal display includes a plurality of signal lines Gni, Gni+1, Dj, Dj', Dj+1, Dj+1', Chigh, and Clow. In particular, the liquid crystal display includes gate lines Gn to transmit a gate signal (also, called "a scan signal"), pairs of data lines (Dj, Dj') and (Dj+1, Dj'+1) to transfer a data voltage, and pairs of power lines Chigh and Clow to transfer a constant voltage. Each gate line Gn is divided into a first gate line Gni and a second gate line Gni+1 that extend between the pixel rows. A gate-on signal or a gate-off signal is simultaneously applied to the first gate line Gni and the second gate line Gni+1.

Each first pixel PX(i, j) is connected to a first gate line Gni of a pair of gate lines (Gni, Gni+1), a first data line Dj, power lines Chigh and Clow, a first switching element Qaj, a second switching element Qbj, and a liquid crystal capacitor Clc. The first switching element Qaj and the second switching element Qbj operate as three terminals of a thin film transistor of the like. The first switching element Qaj includes a control terminal connected to the first gate line Gni, an input terminal connected to the first data line Dj, and an output terminal connected to the liquid crystal capacitor Clc. The second switching element Qbj includes a control terminal connected to the first gate line Gni, an input terminal connected to the first power line Chigh, and an output terminal connected to the liquid crystal capacitor Clc.

The second pixel PX(i+1, j) is connected to the second gate line Gni+1, a second data line Dj', the power lines Chigh and Clow, a third switching element Qcj, and a liquid crystal capacitor Clc connected thereto. The third switching element Qcj operates as three terminals element of a thin film transistor of the like. The third switching element Qcj includes a control terminal connected to the second gate line Gni+1, an input terminal connected to the second data line Dj', and an output terminal connected to one terminal of the liquid crystal capacitor Clc. The other terminal of the liquid crystal capacitor Clc of the second pixel PX (i+1, j) is connected to the second switching element Qbj of the first pixel PX(i, j).

The third pixel PX(i, j+1) is connected to the first gate line Gni, a third data line Dj+1, the power lines Chigh and Clow, a fourth switching element Qaj+1, a fifth switching element Qbj+1, and a liquid crystal capacitor Clc. The fourth switching element Qaj+1 and the fifth switching element Qbj+1 operate as three terminals of a thin film transistor. The fourth switching element Qaj+1 includes a control terminal connected to the first gate line Gni, an input terminal connected to the third data line Dj+1, and an output terminal connected to the liquid crystal capacitor Clc. The fifth switching element Qbj+1 includes a control terminal connected to the first gate line Gni, an input terminal connected to the second power line Clow, and an output terminal connected to the liquid crystal capacitor Clc.

The fourth pixel PX(i+1, j+1) is connected to a second gate line Gni+1, a fourth data line Dj+1', power lines Chigh and Clow, a sixth switching element Qcj+1, and a liquid crystal capacitor Clc. The sixth switching element Qcj+1 operates as three terminals of a thin film transistor. The sixth switching element Qcj+1 includes a control terminal connected to the second gate line Gni+1, an input terminal connected to the fourth data line Dj+1', and an output terminal connected to one terminal of the liquid crystal capacitor Clc of the fourth pixel PX(i+1, j+1). The other terminal of the liquid crystal capacitor Clc is connected to the second switching element Qbj+1 of the third pixel PX(i, j+1).

The liquid crystal display includes storage capacitors Cst1 and Cst2, which are connected to the first pixel electrodes PEa of the second pixel PX(i+1, j) and the fourth pixel PX(i+1, j+1). The storage capacitors Cst1 are also connected to the first power line Chigh. The storage capacitors Cst2 are also connected to the second power line Clow. By including the storage capacitors Cst1 and Cst2, it is possible to maintain a voltage applied to the pixel electrodes PEa and PEb and prevent light leakage generated below the second pixel PX(i+1, j) and the fourth pixel PX(i+1, j+1).

Although not shown, the power lines Chigh are connected to each other, so as to be applied with the same first voltage. The power lines Clow are also connect, so as to be applied with the same second voltage. The first voltage and the second voltage applied to the first power lines Chigh and the second power lines Clow have different polarities from each other, with respect to the reference voltage Vref. For example, when the reference voltage Vref is 7.5V, the first voltage may be about 15V or more, and the second voltage may be about 0V or less and vice versa.

When the gate-on voltage is applied to the gate line Gn, the first data voltage is applied to the first pixel PX(i, j) through the turned-on first switching element Qaj, the first voltage is applied to the first pixel PX(i, j) and the second pixel PX(i+1, j) through the turned-on second switching element Qbj, and the second data voltage is applied to the second pixel PX(i+1, j) through the turned-on third switching element Qcj. In addition, the third data voltage is applied to the third pixel PX(i, j+1) through the turned-on fourth switching element Qaj+1, the second voltage is applied to the third pixel PX(i, j+1) and the fourth pixel PX(i+1, j+1) through the turned-on fifth switching element Qbj+1, and the fourth data voltage is applied to the fourth pixel PX(i+1, j+1) through the turned-on sixth switching element Qcj+1.

That is, the first data voltage flows from the first data line Dj, through the first switching element Qaj, and is applied to the first pixel electrode PEa of the first pixel PX(i, j). The first voltage flows from the first power line Chigh, through the second switching element Qbj, and is applied to the second pixel electrode PEb. A resultant voltage difference between the first pixel electrode PEa and the second pixel electrode PEb is a charging voltage of the liquid crystal capacitor Clc of the first pixel PX(i, j). In this case, the first data voltage and the first voltage are voltages corresponding to a luminance to be displayed by the first pixel PX(i, j) and have opposite polarities opposite to each other, with respect to the reference voltage Vref.

In addition, the first voltage flows from the first power line Chigh, through the second switching element Qbj, and is applied to the first pixel electrode PEa of the second pixel PX(i+1, j). The second data voltage flows from the second data line Dj', through the third switching element Qci, and is applied to the second pixel electrode PEb. In this case, the first voltage and the second data voltage are voltages corresponding to a luminance to be displayed by the second pixel PX(i, j+1) and have polarities opposite to each other, with respect to the reference voltage Vref. Accordingly, the polarities of the first data voltage and the second data voltage may be the same as each other, with respect to the reference voltage Vref.

The third data voltage flows from the third data line Dj+1, through the fourth switching element Qaj+1, and is applied to the first pixel electrode PEa of the third pixel PX(i, j+1). The second voltage flows from the second power line Clow, through the fifth switching element Qbj+1, and is applied to the second pixel electrode PEb. A voltage difference between the first pixel electrode PEa and the second pixel electrode PEb, to which the third data voltage and the second voltage are applied, respectively, is a charging voltage of the liquid crystal capacitor Clc of the third pixel PX(i, j+1). In this case, the third data voltage and the second data voltage are voltages corresponding to a luminance to be displayed by the third pixel PX(i, j+1) and have polarities opposite to each other, with respect to the reference voltage Vref.

The second voltage flows from the second power line Clow, through the fifth switching element Qbj+1, and is applied to the first pixel electrode PEa of the fourth pixel PX(i+1, j+1). The fourth data voltage flows from the fourth data line (Dj+1'), through the sixth switching element Qcj+1, and is applied to the second pixel electrode PEb. In this case, the second voltage and the fourth data voltage are voltages corresponding to a luminance to be displayed by the fourth pixel PX(i+1, j+1) and have polarities opposite to each other, with respect to the reference voltage Vref.

Conventionally, in order to drive pairs of pixel electrodes included in two pixels that are adjacent in a column direction, voltages having different polarities are applied by different switching elements and charged to capacitors. In addition, the pixels are connected to two different gate lines and two different data lines, to which the gate-on voltages are applied at different times, or are connected to one data line and four different data lines, to which the gate-on voltages are applied at the same time. That is, when the two pixels are connected to different gate lines, since the data voltages are applied to the different pixel electrodes of the two pixels, through two data lines for different gate-on times, and the gate-on signals are sequentially applied, the driving speed is slow. In addition, when two pixels adjacent in a column direction are connected to the gate lines to which the same gate-on voltage is applied, since two data voltages should be simultaneously applied to the first pixel electrodes and the second pixel electrodes of two pixels, a total of four data lines are required. As the number of the data lines increases, the cost of the liquid crystal display driver increases.

However, in the present liquid crystal display, the first pixel PX(i, j) and the second pixel PX(i+1, j) are connected to the first gate line Gni and the second gate line Gni+1, which are sublines of the same gate line Gn. As such, the gate-on/off voltages are applied through one gate line Gn. Accordingly, the driving speed may be increased.

In addition, since one of the pixel electrodes PEa and PEb of two pixels adjacent to each other in a column direction are connected to the first power line Chigh and the second power line Clow, rather than an additional data line, the number of data lines is reduced. As such, it is possible to reduce the cost of the driver of the liquid crystal display.

Further, since two pixel electrodes receive the first voltage or the second voltage through one of the switching elements Qbj and Qbj+1, an additional switching element is not required. In addition, an aperture ratio of the liquid crystal display can be increased.

As such, in the present liquid crystal display, two pixels adjacent to each other in a pixel column direction are connected to each other and simultaneously connected to two gate lines receiving the gate on/off voltages, two data lines, and one power line. Therefore, since the driving speed increases and the number of the data lines is reduced, it is possible to reduce the cost of the driver of the liquid crystal display and to increase the aperture ratio of the liquid crystal display. In accordance with layouts of a signal line and a pixel of the liquid crystal display, two power lines are additionally provided, as compared with general layouts of the signal line and the pixel, but only a simple driver for applying a voltage having a constant value is added, because the same magnitude of voltage is always applied to each of the power lines. As such, that the driving method is simplified and manufacturing costs are reduced.

As described above, the layouts and driving methods of the signal line and pixel of the liquid crystal display may be applied to all forms of pixel structures including a first pixel electrode and a second pixel electrode formed on the same layer and alternately disposed.

Figure 5:
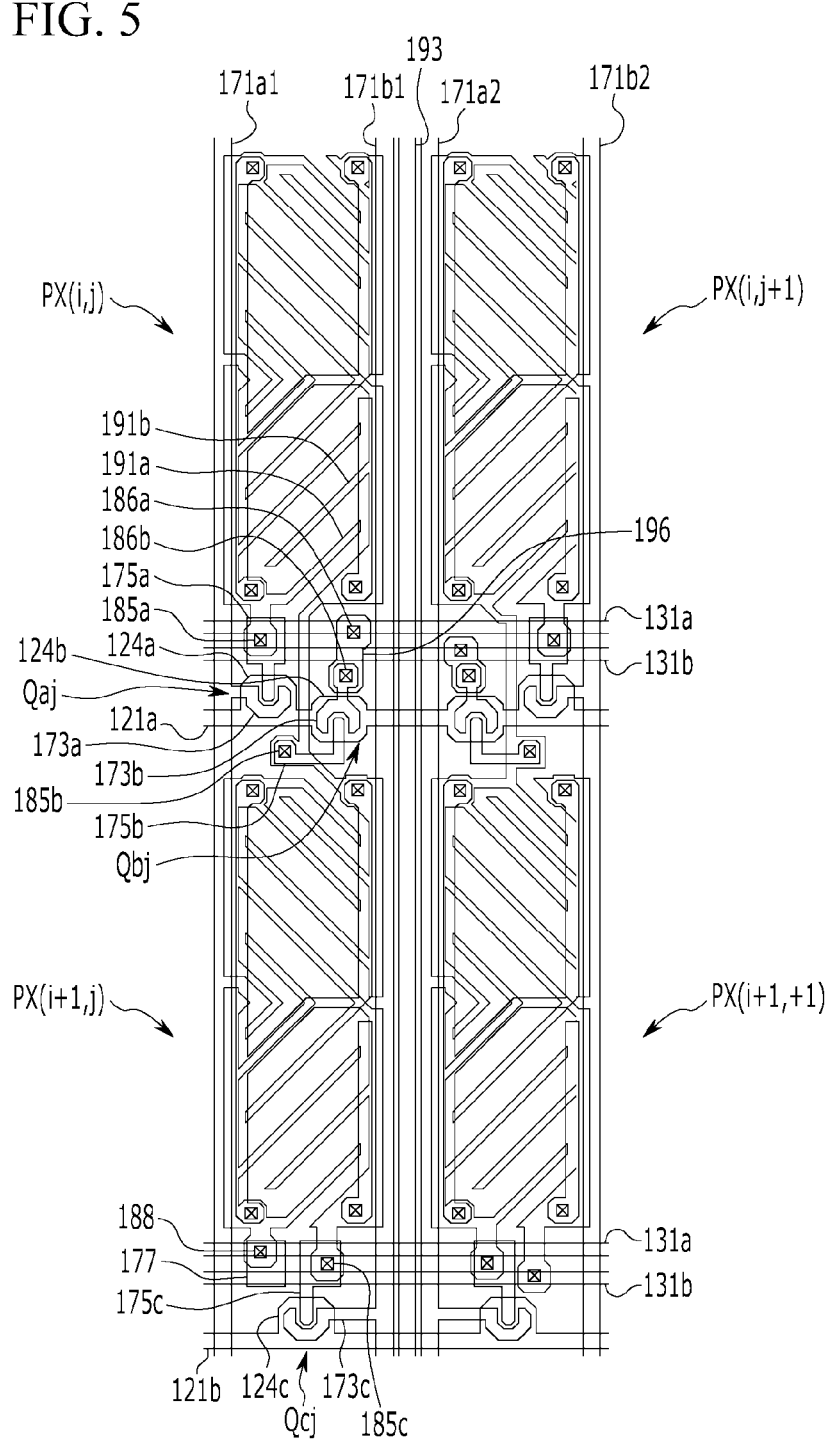
FIG. 5 is an equivalent circuit diagram for four pixels of the liquid crystal display shown in FIG. 4.

FIG. 5 is an example of a pixel structure of the liquid crystal display shown in FIG. 4. Referring to FIG. 4, the liquid crystal display includes the first pixel PX(i, j), the second pixel PX(i+1, j), the third pixel PX(i, j+1), and the fourth pixel PX(i+1, j+1). The liquid crystal display also includes gate lines 121a and 121b, data lines 171a1, 171b1, 171a2, and 171b2, a first power line 131a, a second power line 131b, and a third power line 193, which are connected to the pixels. The first power line 131a and the second power line 131b may be formed on the same layer as the gate lines 121a and 121b and the third power line 193 may be formed on the same layer as the data lines 171a1, 171b1, 171a2, and 171b2.

The first pixel PX(i, j) includes a first pixel electrode 191a and a second pixel electrode 191b respectively connected to a first switching element Qaj and a second switching element Qbj. The first switching element Qaj includes a first gate electrode 124a, a first source electrode 173a, and a first drain electrode 175a. The second switching element Qaj includes a second gate electrode 124b, a second source electrode 173b, and a second drain electrode 175b.

The first source electrode 173a is connected to the data line 171a1, and the second source electrode 173b is connected to the first power line 131a. The second pixel PX(i+1, j) includes the first pixel electrode 191a connected to the second switching element Qbj and the second pixel electrode 191b connected to a third switching element Qcj. The third switching element Qcj includes a third gate electrode 124c, a third source electrode 173c, and a third drain electrode 175c.

The first drain electrode 175a is connected to the first pixel electrode 191a of the first pixel PX(i, j), through a contact hole 185a. The second drain electrode 175b is connected to the second pixel electrode 191b of the first pixel PX(i, j) and is connected to the first pixel electrode 191a of the second pixel PX(i+1, j) through a contact hole 185b. The third drain electrode 175c is connected to the second pixel electrode 191b of the second pixel PX(i+1, j) through a contact hole 185c. The second source electrode 173b and the first power line 131a may be electrically connected by a connection member 196 covering the second source electrode 173b and the first power line 131a, which are exposed through the contact holes 186a and 186b, respectively. The connection member 196 may be formed on the same layer as the first pixel electrode 191a or the second pixel electrode 191b. In addition, the first power line 131a and the third power line 193 may be electrically connected by a connection member 197 covering the first power line 131a and the third power line 193, which are exposed through the contact holes 187a and 187b, respectively. The first pixel electrode 191a and the second pixel electrode 191b of each pixel are formed on the same layer and are interlaced.

The first power line 131a and the second power line 131b, disposed below the second pixel PX(i+1, j) overlap a storage conductor 177 that is connected to the first pixel electrode 191a through a contact hole 188, to form a storage capacitor. The storage conductor 177 may be formed on the same layer as the data lines 171a1, 171b1, 171a2, and 171b2. The first power line 131a and the second power line 131b can prevent light leakage below the second pixel PX(i+1, j).

Figure 6:
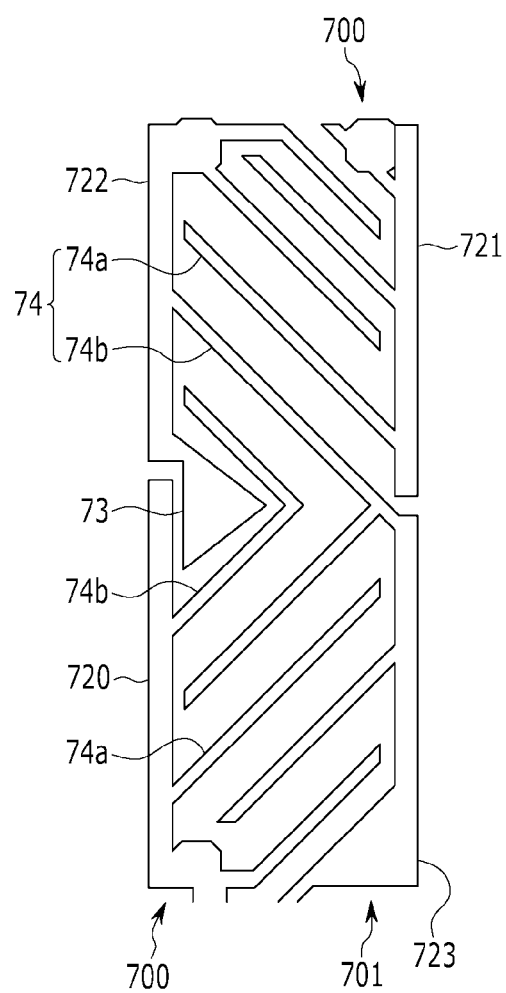
FIG. 6 is a layout view illustrating a pixel in a liquid crystal display, according to an exemplary embodiment of the present invention.

FIG. 6 is a layout view illustrating a first pixel electrode 700 and a second pixel electrode 701, as disposed in a pixel area of a liquid crystal display, according to an exemplary embodiment of the present invention. Referring to FIG. 6, the first pixel electrode 700 is paired with the second pixel electrode 701, so as to form generally rectangular structures covering the pixel area. The first pixel electrode 700 includes stems 720, 721, and the second pixel electrode 701 includes stems 722, 723. The pixel electrodes 700, 701 include branches 74 that extend from the stems 720-723. The branches 74 of the first pixel electrode 700 and the second pixel electrode 701 are alternately disposed (interlaced) and extend into the pixel area. The first and second pixel electrodes 700, 701 include portions that extend outside of the pixel area. The first pixel 700 includes a connection portion (not shown) that connects top and bottom portions thereof.

The branches 74 include generally straight branches 74a and generally V-shaped branches 74b. The branches 74a obliquely extend from the stems 720-723, in a first direction or a second direction that is generally orthogonal to the first direction. The branches 74 may form an angle of approximately 45 degrees with respect to a horizontal line extending through the pixel area. Adjacent branches 74a generally point in the same direction, and the branches 74b are disposed between the branches 74a that point in the first direction and the branches 74a that point in the second direction.

The pixel electrode 701 includes an extension 73 that protrudes from an end the stem 722 and is disposed inside the branches 74b. The extension 73 is generally pyramidal and has an apex disposed adjacent to the center of the pixel area. The average minimum distance between the extension 73 and the closest branch 74b may be smaller than the average minimum distance between adjacent branches 74. The minimum distance between the extension 73 and the adjacent branch 74b may gradually become smaller. In particular, the minimum distances taken from portions of the extension 73 closer to the center of the pixel area may be less than the minimum distance taken from portions of the extension 73 closer to the stem 722. In other words, edges of the extension 73 are not parallel to corresponding edges of the branches 74 and may form an angle of less than 45 degrees with respect to a horizontal line crossing the pixel area. As such, the apex of the extension 73 is closest to the adjacent branch 74b.

Since the edges of the extension 73 are not parallel to the corresponding edges of the adjacent branch 74b, irregular movements of the liquid crystal may be prevented. In other words, the structure of the extension 73 can limit the movement of the liquid crystal from the edge of the pixel area toward the center of the pixel area.

The intensity of a horizontal electric field applied to the liquid crystal is determined by gaps between the pixel electrodes 700, 701. Since the gap between the branch 74b adjacent to the extension 73 varies, the intensity of the corresponding electric field applied to the liquid crystal varies accordingly. Thus, the irregular movement of the liquid crystal at the edge of the pixel area can be reduced, as compared with the case where a constant electric field is applied. Accordingly, it is possible to prevent a reduction in display quality that occurs when the liquid crystal is not uniformly distributed in a pixel.

Figure 7:
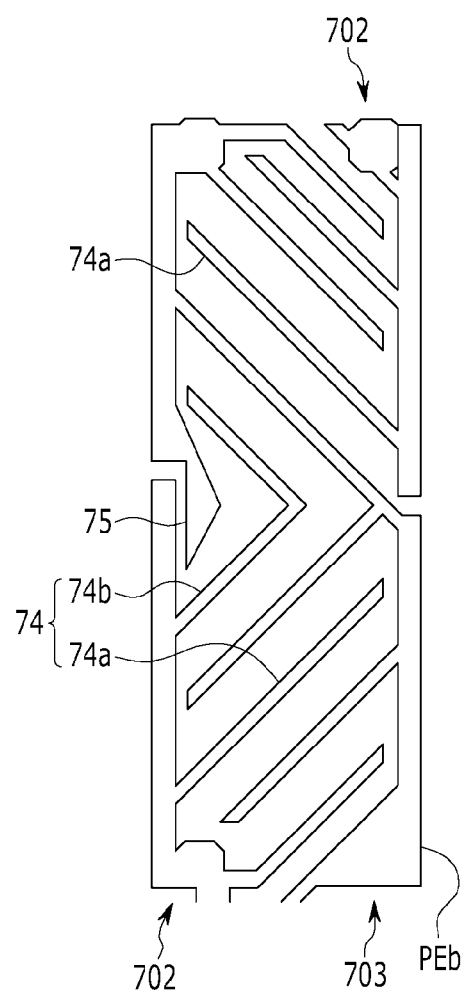
FIG. 7 is a layout view illustrating a form of a pixel of a liquid crystal display, according to another exemplary embodiment of the present invention.

FIG. 7 is a layout view illustrating a first pixel electrode 702 and a corresponding second pixel electrode 703 of a liquid crystal display area, according to another exemplary embodiment of the present invention. Referring to FIG. 7, the pixel electrodes 702, 703 are similar to the pixel electrodes 700, 701, so only the difference there between will be described in detail.

The second pixel electrode 70 includes an extension 75 having a generally triangular shape, which is different than the shape of the extension 73. The extension 75 includes a base that is formed by an edge of the extension that is disposed furthest from the center of the pixel area, and an apex that is disposed closest to the center of the pixel area. An average minimum distance between the extension 75 and the adjacent branch 74b may be larger than the average minimum distance between the branches 74. The minimum distance may increase, when measured from points of the extension 75 that are closer to the center of the pixel area, and may gradually decrease when measured from points on the extension 75 that are further away from the center of the pixel area. In addition, edges of the extension 75 that face the adjacent branch 74b are not parallel to the corresponding edges of the branch 74b, and may form an angle of more than 45 degrees with a horizontal line crossing the center of the pixel area.

As such, it is possible to prevent the irregular movement of the liquid crystal, because an electric field formed between the extension 75 and the adjacent branch 74b varies in accordance with a distance from the center of the pixel area. As such, a corresponding reduction in image quality can be reduced.

Figure 8:
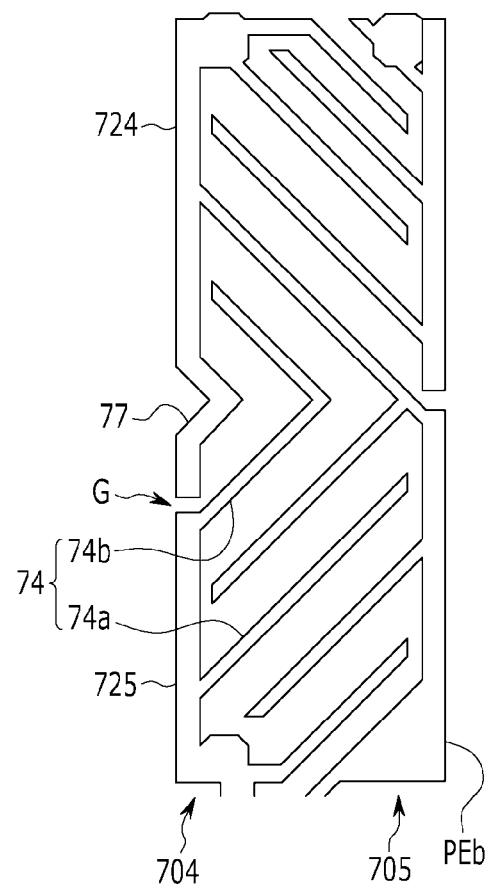
FIG. 8 is a layout view illustrating a form of a pixel of a liquid crystal display, according to yet another exemplary embodiment of the present invention.

FIG. 8 is a layout view illustrating a first pixel electrode 704 and a second pixel electrode 705 of a pixel area of a liquid crystal display, according to yet another exemplary embodiment of the present invention. Referring to FIG. 8, the pixel electrodes 704, 705 are similar to the pixel electrodes of FIGS. 6 and 7, so only difference there between will be described in detail.

The pixel electrode 705 includes a stem 724 having a portion that is inwardly bent, so as to form an extension 77. Edges of the extension 77 may be generally parallel to corresponding edges of the adjacent branch 74b. The pixel electrode 704 includes a stem 725. The stems 724, 725 are separated by a gap G. The gap G is disposed below a horizontal line extending through the center of the pixel area. As such, it is possible to prevent the liquid crystal from being concentrated in the center of the pixel area.

Figure 9:
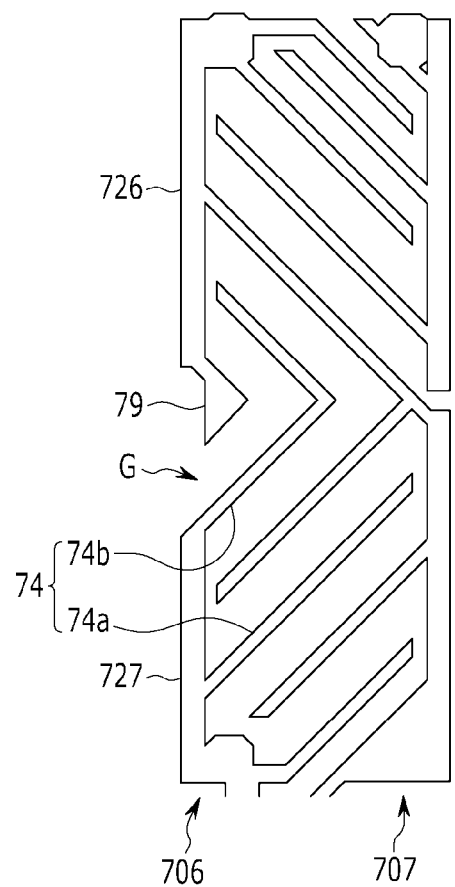
FIG. 9 is a layout view illustrating a form of a pixel of a liquid crystal display, according to still another exemplary embodiment of the present invention.

FIG. 9 is a layout view illustrating a first pixel electrode 706 and a second pixel electrode 707 of a pixel area of a liquid crystal display, according to still another exemplary embodiment of the present invention. Referring to FIG. 9, the pixel electrodes 706, 707 are similar to the pixel electrodes of FIGS. 6-8, so only difference there between will be described in detail.

The first pixel electrode 706 includes a stem 726. The second pixel electrode 707 includes a stem 727 and an extension 79 that extends from an end of the stem 726. A gap G between the ends of the stems 726, 727 is larger than in the embodiments shown in FIGS. 6-8. In detail, the gap G is larger than the average minimum distance between the adjacent branches 74. Since the gap G is relatively large and is disposed adjacent to a horizontal line extending through the center of the pixel area, it is possible to reduce the irregular movement of the liquid crystal molecules between two pixel electrodes 706, 707, from the edge of pixel area into the center of the pixel area.

Figure 10:
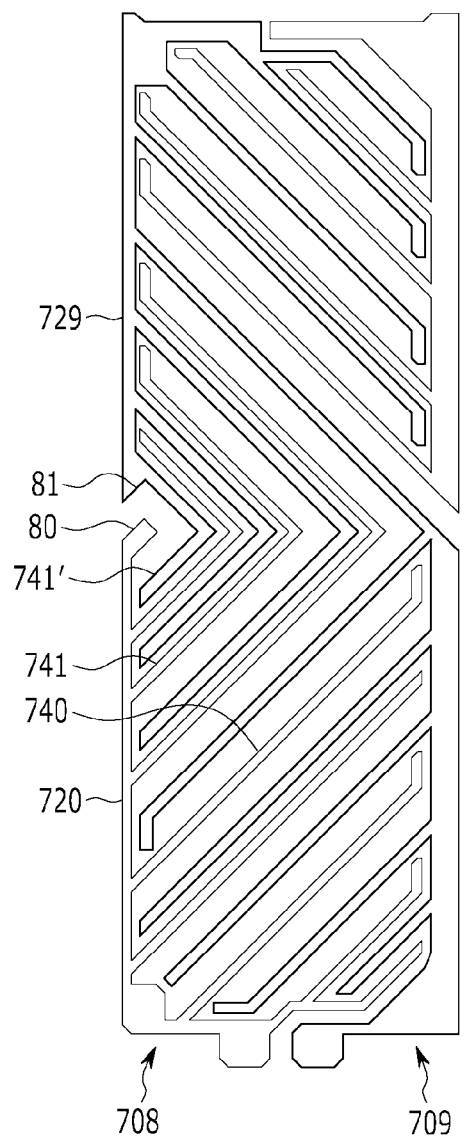
FIG. 10 is a layout view illustrating a form of a pixel of a liquid crystal display, according to still yet another exemplary embodiment of the present invention.

FIG. 10 is a layout view illustrating a first pixel electrode 708 and a second pixel electrode 709 of a pixel area of a liquid crystal display, according to still yet another exemplary embodiment of the present invention. Referring to FIG. 10, the pixel electrodes 708, 709 are similar to the pixel electrodes of FIGS. 6-9, so only difference there between will be described in detail.

The pixel electrodes 708, 709 respectively include stems 728, 729. The first pixel electrode 708 also includes an extension 80 that extends from an end of the stem 728, and the second pixel electrode 709 includes an extension 81 that extends from the stem 729.

The pixel electrodes 708, 709 also include branches 740, 741 that extend from the respective stems 728, 729. The branches 740 are generally straight. However, end portions of some of the branches 740 may be bent, so as to be generally parallel to the stems 728, 729. The branches 741 are generally V-shaped and may also include similar bent end portions.

In contrast to the previous exemplary embodiments, the second pixel electrode 709 includes an additional branch 741' that extends from the extension 81. The extension 80 is partially surrounded by the branch 741'. In addition, a minimum distance between the extension 80 and the branch 741' may be larger than an average minimum distance between adjacent branches 740, 741.

Since the extension 80 is disposed adjacent to the center of the pixel area and is partially surrounded by the branch 741', it is possible to prevent the irregular movement of the liquid crystal there between. Accordingly, it is possible to prevent the liquid crystal molecules from being concentrated in the center of the pixel area.

As described above, the exemplary embodiments of the present invention, it is possible to ensure both a high contrast ratio and a wide viewing angle of the liquid crystal display. It is also possible to increase the response speed of the liquid crystal molecules, prevent signal delays, and reduce the cost of the driver of the liquid crystal display, by reducing the number of the data lines. In addition, since the pixel electrodes have various shapes, it is possible to prevent the irregular movement of the liquid crystal molecules.

Figure 11:
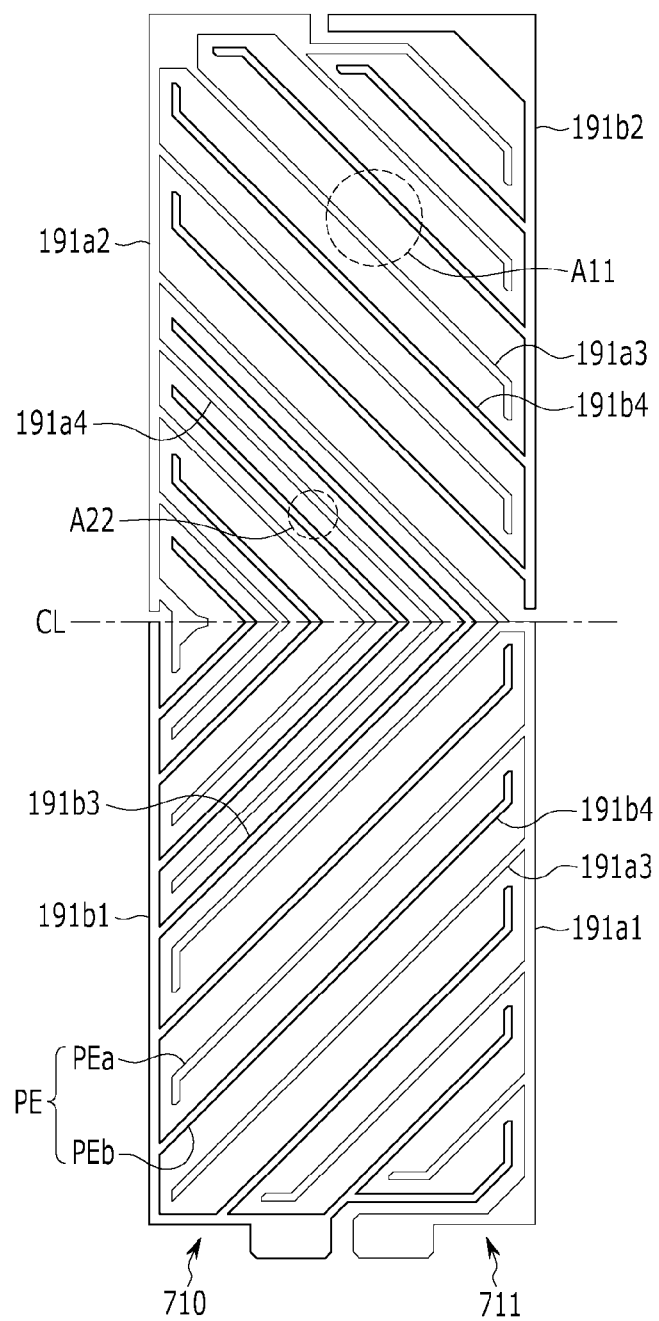
FIG. 11 is a layout view illustrating a form of a pixel of a liquid crystal display, according to still yet another exemplary embodiment of the present invention.

FIG. 11 is a layout view illustrating a first pixel electrode 710 and a second pixel electrode 711 disposed in a pixel area of a liquid crystal display, according to still yet another exemplary embodiment of the present invention. Referring to FIG. 11, the first pixel electrode 710 includes a lower stem $191a1$, an upper stem $191a2$, and first branches $191a3$ and second branches $191a4$ extending from the lower stem $191a1$ and the upper stem $191a2$, respectively. The second pixel electrode 711 includes a lower stem $191b1$, an upper stem $191b2$, and third branches $191b3$ and fourth branches $191b4$ extending from the lower stem $191b1$ and the upper stem $191b2$, respectively.

The lower stem $191a1$ and the upper stem $191a2$ are disposed at the left and right sides of the pixel area. The lower stem $191b1$ and the upper stem $191b2$ of the second pixel electrode PEb are disposed at the left and right sides of the pixel area.

The pixel electrodes 710, 711 overlap data lines disposed at the right and left sides of the pixel area, and as a result, parasitic capacitances occur there between. However, since the pixel electrodes 710, 711 are generally symmetrical with respect to a center line CL extending horizontally through the center of the pixel area, the parasitic capacitances may be the same for each. As such, it is possible to prevent crosstalk that occurs as a result of a parasitic capacitance deviations between the left and right sides of the pixel area.

The branches $191a3$, $191a4$, $191b3$, $191b4$ may form angles of approximately 45 degrees with the horizontal center line CL. The branches $191a3$, $191a4$, $191b3$, $191b4$ are alternately disposed at regular intervals, so as to form a comb (interlaced) pattern. Specifically, the branches $191a3$, $191b4$ are disposed in upper and lower portions (low-gray region) of the pixel area. The branches $191a4$, $191b3$ are disposed in a central portion (high-gray region) of the pixel area, between the upper and lower regions.

In an area A11 of the low-gray region, a minimum distance between the branches $191a3$, $191b4$ may be larger than a minimum distance between the branches $191a4$, $191b3$ in an area A11 of the high-gray region. The branches $191a3$, $191b4$ may have a first width, and the branches 191*a*4, 191*b*3 may have a different second width. In addition, the widths of the branches 191*a*3, 191*a*4, 191*b*3, 191*b*4 may vary within the low-gray and high-gray regions. The high-gray region may be smaller than that of the low-gray region. For example, the area of the low-gray region may be at least about 8 to 10 times larger than that of the high-gray region. In addition, the minimum distance in area A11 may be at least about 2 μm more than the minimum distance in the area A22. For example, the minimum distance in area A11 may be about 30 μm, and the minimum distance in area A11 may be about 28 μm.

Since the distances between the various branches may be varied within the pixel area, it is possible to vary the orientation of liquid crystal molecules and produce different luminance levels, using only a single source of image information. By appropriately adjusting the gaps between the first and second electrodes 710, 711, it is possible to increase the viewing angle of an image by improving side view image quality and to improve transmittance. In addition, by adjusting an area ratio of the high-gray region and the low-gray region it is possible to prevent an afterimage from being formed in the low-gray region.

However, the present invention is not limited to the pixel electrodes shown in the exemplary embodiments. For example, different combinations of the first and second pixel electrodes can be used, or the pixel electrodes may be modified in other ways.

Figure 12A:
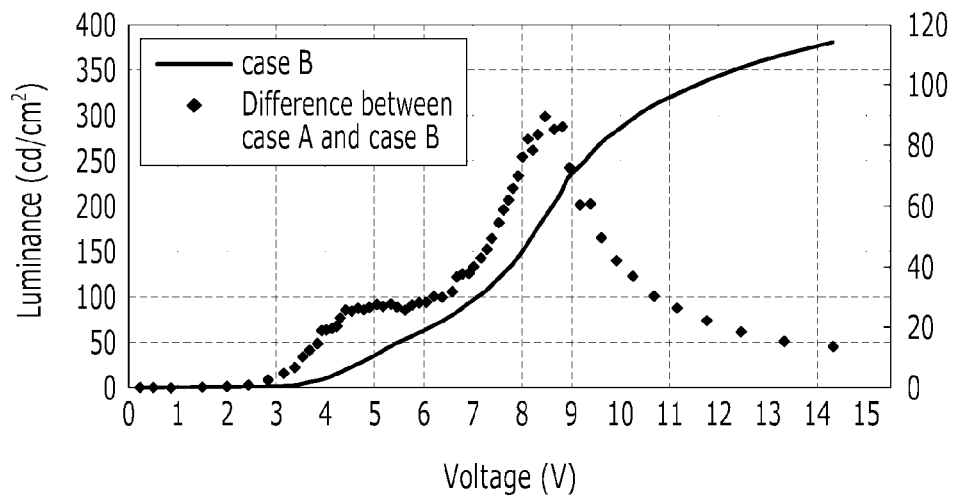
FIGS. 12A and 12B are graphs illustrating luminance variations depending on gray levels of the liquid crystal display, of an undivided pixels and a pixel divided into a low-gray region and a high-gray region, respectively.
Figure 12B:
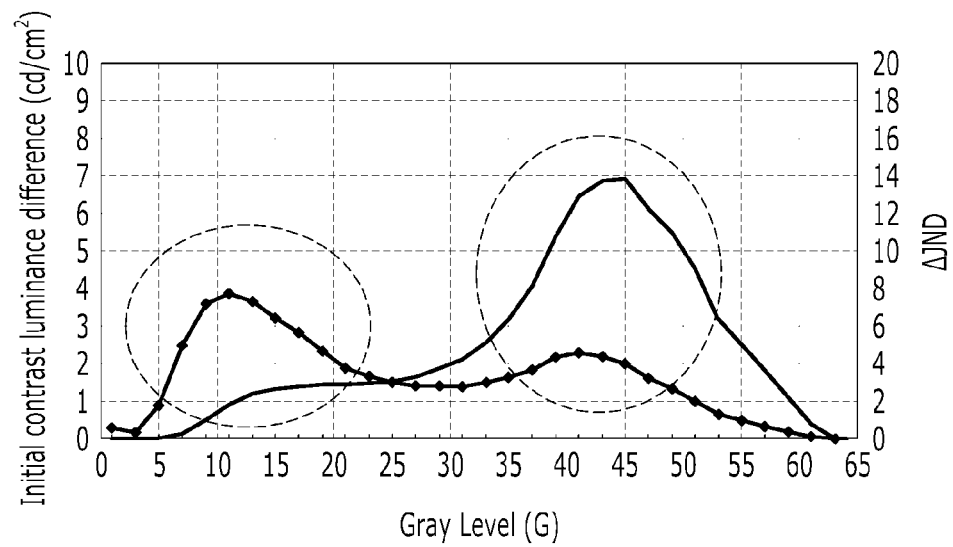
Figure 13:
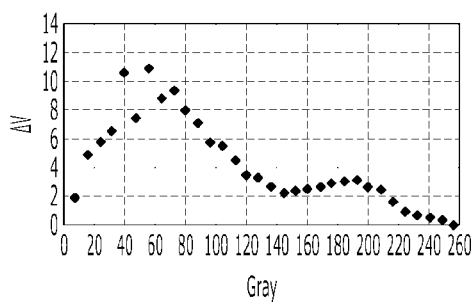
FIG. 13 is a graph illustrating luminance variations depending on gray levels of liquid crystal displays, according to variations of ratios between low-gray regions and high-gray regions.
Figure 13:
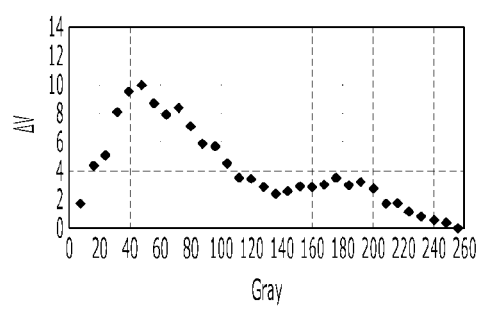
Figure 13:
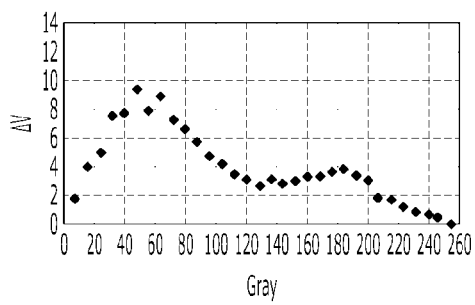
Figure 13:
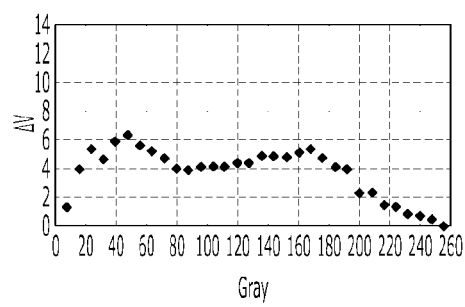
Figure 14:
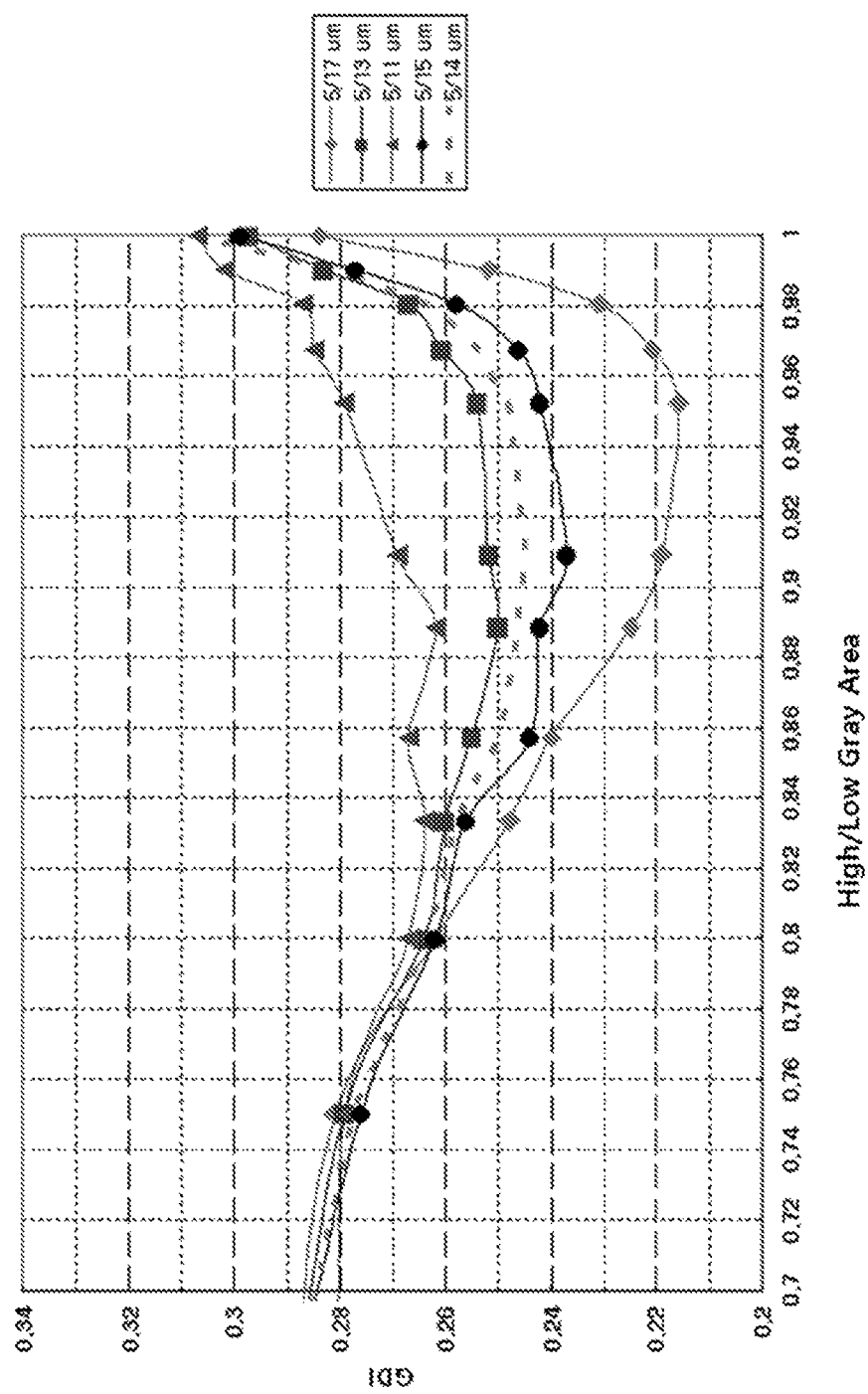
FIG. 14 is a graph illustrating a difference between front gammas and side gammas of the liquid crystal displays, according to variations of ratio between low-gray regions and high-gray regions.

FIGS. 12A and 12B are graphs illustrating gray level luminance variations of a liquid crystal display that does not include a low-gray region and a high-gray region, and a liquid crystal display that does include a low-gray region and a high-gray region, respectively. FIG. 13 is a graph illustrating gray level luminance variations of the liquid crystal displays having various low-gray region to high-gray region area ratios. FIG. 14 is a graph illustrating differences between front gammas and side gammas of liquid crystal displays, according to different low-gray region to high-gray region area ratios.

Referring to FIGS. 12A and 12B, as compared with the case A where a low-gray region and a high-gray region are not divided, in the case B where a low-gray region and a high-gray region are divided, a difference of initial contrast luminance is large at the low gray levels. That is, an after image is more likely to occur in the case where a low-gray region and a high-gray region are divided.

However, in the liquid crystal display according to an exemplary embodiment of the present invention, since the low-gray region is formed to be at least about 8 times larger than the high-gray region, it is possible to prevent deterioration of display quality such as the afterimage occurring in the low-gray, that may be induced in the case where a low-gray region and a high-gray region are divided.

Referring to FIG. 13, when the area ratios of the low-gray regions with respect to the high-gray regions are about 1:3, 1:4, and 1:5, a difference ($\Delta V$) of initial contrast luminance is large in the low gray levels. However, when the area ratio of the low-gray region to the high-gray region is about 1:20 and the area of the low-gray region is 8 times or more larger than the area of the high-gray region, the difference of initial contrast luminance is largely reduced in the low gray levels.

Therefore, like the liquid crystal display according to the exemplary embodiment of the present invention, since the low-gray region is formed to be at least about 8 times larger than the high-gray region, it is possible to prevent deterioration of display quality that may occur in the low-gray.

Referring to FIG. 14, when the area ratio of the low-gray region with respect to the high-gray region is more than about 1:8, a difference (GDI) between front gamma and side gamma of the liquid crystal display is reduced. Therefore, it is possible to improve the side visibility of the liquid crystal display and reduce the deterioration of display quality such as the afterimage.

The layouts and driving methods of the signal line and the pixel in the liquid crystal display according to the exemplary embodiments described above may be applied to all forms of the pixel structures.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate and an opposing second substrate;
   a first pixel electrode disposed on the first substrate in a pixel area, the first pixel electrode comprising a first stem disposed at an edge of the pixel area, first branch electrodes extending from the first stem into the pixel area, and an extension extending from an end of the first stem into the pixel area;
   a second pixel electrode disposed on the first substrate in the pixel area, the second pixel electrode comprising a second stem disposed at the edge of the pixel area and second branch electrodes extending from the second stem and between the first branch electrodes; and
   a liquid crystal layer interposed between the first and second substrates,
   wherein the extension is disposed in a central portion of the pixel area lengthwise, and extends from the first stem toward the second stem without overlapping with the second stem, and
   an average minimum distance between the extension and the closest second branch electrode is different from the average minimum distance between adjacent ones of the first and second branch electrodes.

2. The liquid crystal display of claim 1, wherein the minimum distance between the extension and the closest second branch electrode is smaller than the average minimum distance between adjacent ones of the first and second branch electrodes.

3. The liquid crystal display of claim 2, wherein:
   a minimum distance between a point on the extension and the closest second branch electrode becomes smaller as the point is moved closer to the center of the pixel area.

4. The liquid crystal display of claim 3, further comprising:
   a gate line disposed on the first substrate and to transmit a gate signal;
   a data line disposed on the first substrate;
   a power line disposed on the first substrate;
   a first switching element connected to the gate line and the data line; and
   a second switching element connected to the gate line and the power line,
   wherein the first pixel electrode is connected to the first switching element, and the second pixel electrode is connected to the second switching element.

5. The liquid crystal display of claim 4, wherein:
   when a gate-on signal is applied to the gate line, a data voltage is applied to the first pixel electrode through the data line, and a first voltage is applied to the second pixel electrode through the power line, and the data voltage and the first voltage have different polarities.

6. The liquid crystal display of claim 1, wherein: the minimum distance between the extension and the closest second branch electrode is larger than the average minimum distance between the adjacent first and second branch electrodes.

7. The liquid crystal display of claim 6, wherein: a minimum distance between a point on the extension and the closest second branch electrode increases as the point is moved further from the center of the pixel area.

8. The liquid crystal display of claim 7, further comprising:
a gate line disposed on the first substrate and to transmit a gate signal;
a data line disposed on the first substrate;
a power line disposed on the first substrate;
a first switching element connected to the gate line and the data line; and
a second switching element connected to the gate line and the power line,
wherein the first pixel electrode is connected to the first switching element, and the second pixel electrode is connected to the second switching element.

9. The liquid crystal display of claim 8, wherein:
when a gate-on signal is applied to the gate line, a data voltage is applied to the first pixel electrode through the data line, and a first voltage is applied to the second pixel electrode through the power line, and
the data voltage and the first voltage have different polarities.

* * * * *